(12) United States Patent
Zhu et al.

(10) Patent No.: US 7,925,049 B2
(45) Date of Patent: Apr. 12, 2011

(54) STEREO-BASED VISUAL ODOMETRY METHOD AND SYSTEM

(75) Inventors: Zhiwei Zhu, Plainsboro, NJ (US); Taragay Oskiper, East Windsor, NJ (US); Oleg Naroditsky, Princeton, NJ (US); Supun Samarasekera, Princeton, NJ (US); Harpreet Singh Sawhney, West Windsor, NJ (US); Rakesh Kumar, Monmouth Junction, NJ (US)

(73) Assignee: SRI International, Menlo Park, CA (US)

( * ) Notice: Subject to any disclaimer, the term of this patent is extended or adjusted under 35 U.S.C. 154(b) by 921 days.

(21) Appl. No.: 11/833,498

(22) Filed: Aug. 3, 2007

(65) Prior Publication Data
US 2008/0144925 A1    Jun. 19, 2008

Related U.S. Application Data

(60) Provisional application No. 60/837,707, filed on Aug. 15, 2006.

(51) Int. Cl.
*G06F 9/00* (2006.01)
(52) U.S. Cl. .................. 382/103; 382/104; 382/154
(58) Field of Classification Search .............. 382/103, 382/104, 154
See application file for complete search history.

(56) References Cited

U.S. PATENT DOCUMENTS

| | | | | |
|---|---|---|---|---|
| 6,873,713 | B2 * | 3/2005 | Okazaki et al. | 382/118 |
| 7,158,656 | B2 * | 1/2007 | Covell et al. | 382/106 |
| 2003/0218672 | A1 * | 11/2003 | Zhang et al. | 348/14.16 |
| 2007/0031037 | A1 * | 2/2007 | Blake et al. | 382/173 |

OTHER PUBLICATIONS

Harris et al., "A Combined Corner and Edge Detector," 1988, 4th Alvey Vision Conference.
Nister et al., "Visual Odometry," 2004, IEEE Conference on CVPR.
Hartly et al., "Multiple View Geometry in Computer Vision," 2003, Cambridge University Press, pp. 239-257 and pp. 600-623.
Haralick et al., "Review and Analysis of Solutions of the Three Point Perspective Pose Estimation Problem," 1994, International Journal of Computer Vision, 13(3):331-356.
Foxlin et al., "Pedestrian Tracking with Shoe Mounted Inertial Sensors," 2005, IEEE Computer Graphics and Applications, vol. 25, No, 6, pp. 38-46.

(Continued)

*Primary Examiner* — Tom Y Lu
(74) *Attorney, Agent, or Firm* — Lowenstein Sandler PC (57) ABSTRACT

A method for estimating pose from a sequence of images, which includes the steps of detecting at least three feature points in both the left image and right image of a first pair of stereo images at a first point in time; matching the at least three feature points in the left image to the at least three feature points in the right image to obtain at least three two-dimensional feature correspondences; calculating the three-dimensional coordinates of the at least three two-dimensional feature correspondences to obtain at least three three-dimensional reference feature points; tracking the at least three feature points in one of the left image and right image of a second pair of stereo images at a second point in time different from the first point in time to obtain at least three two-dimensional reference feature points; and calculating a pose based on the at least three three-dimensional reference feature points and its corresponding two-dimensional reference feature points in the stereo images. The pose is found by minimizing projection residuals of a set of three-dimensional reference feature points in an image plane.

26 Claims, 3 Drawing Sheets

OTHER PUBLICATIONS

Olson et al., "Rover Navigation Using Stereo Ego-motion," 2003, Robotics and Autonomous Systems, vol. 43, No. 4, p. 215-229.

Dissanayake et al., "A Solution to the Simultaneous Localization and Map Building (SLAM) Problem," 2001, IEEE Transactions on Robotic and Automation, vol. 17, No. 3, p. 229-241.

Davidson, "Real-Time Simultaneous Localization and Mapping with a Single Camera," 2003, IEEE Conference on Computer Vision.

Strelow et al., "Omnidirectional Visual Odometry fir a Planetary Rover," 2004, IEEE International Conference on Intelligent Robots and Systems.

Sutherland et al., "Inexact Navigation," 1993, IEEE International Conference on Robotics and Automation.

Se et a., "Global Localization Using Distinctive Visual Features," 2002, IEEE International Conference on Intelligent Robots and Systems.

Johnson et al., "Vision Guided Landing of an Autonomous Helicopter in Hazardous Terrain," 2005, IEEE International Conference on Robotics and Automation.

Milella et al., "Stereo-Based Ego-Motion Estimation Using Pixel Tracking and Interactive Closest Point," 2006, IEEE International Conference on Computer Vision Systems.

Roumeliotis et al., "Augmenting Inertial Navigation with Image-based Motion Estimation," 2002, IEEE International Conference on Computer Robotics and Automation.

Volpe, "Mars Rover Navigation Results Using Sun Sensor Heading Determination," 1999, IEEE International Conference on Intelligent Robot and Systems.

Stephens et al., "3D Wire-Frame Integration From Image Sequences," 1989, Butterworth & Co.

* cited by examiner

STEREO-BASED VISUAL ODOMETRY METHOD AND SYSTEM

CROSS-REFERENCE TO RELATED APPLICATIONS

This application claims the benefit of U.S. Provisional Patent Application No. 60/837,707 filed Aug. 15, 2006, the disclosure of which is incorporated herein by reference in its entirety.

GOVERNMENT RIGHTS IN THIS INVENTION

This invention was made with U.S. government support under contract number NBCHC050078. The U.S. government has certain rights in this invention.

FIELD OF THE INVENTION

The present invention relates to vision systems. More specifically, the present invention relates to a stereo-based video odometry method and system for obtaining a pose of an object from a sequence of images.

BACKGROUND OF THE INVENTION

A variety of applications rely on the use of navigation systems, both civilian and military, such as in personal location and route planning assistance, autonomous robot navigation, unknown environment map building, naval and aeronautic tactical fighting systems, land surveys, etc. Unfortunately, many existing navigation systems do not function very well under certain circumstances. For example, GPS (Global Positioning System) is widely used in many of the aforementioned applications. In certain circumstances, however, GPS cannot work reliably if the satellite signals upon which it is based are blocked or unavailable as often occurs in indoor environments, in forests, and in urban areas. Even when it works well, GPS can only provide the location of the user, which is usually not sufficient to assist the user during navigation. For example, when a group of warfighters is performing a military task in an unknown environment, in addition to a warfighter needing to know where each of the other war fighters is located, it would be desirable to see what each of the other warfighters is seeing to foster better cooperation and coordination.

A vision-based navigation system can meet these challenges. Specifically, a vision-based navigation system does not require expensive equipment and can independently estimate 3D position and orientation (pose) accurately by using image streams captured from one, two or more inexpensive video cameras. Vision-based navigation systems can be integrated with GPS and inertial measurement unit (IMU) systems to robustly recover both the location and the 3D gaze or orientation of a user under a wide range of environments and situations. In addition, detailed information and imagery of an environment can be recorded in real time. The imagery can be shared and analyzed to assist the user in reporting what is seen.

A variety of efforts have been made to build a navigation system using vision approaches in the past few decades. In most approaches using computer vision techniques, a set of stationary feature points in the scene is tracked over a sequence of images. The position and orientation change of a camera is determined using the image locations of the tracked feature points. The motion estimation can be done use monocular, binocular (stereo) or multi-camera configurations. In stereo or multi-camera configurations, the 3D location of scene points can be estimated by the binocular disparity of the feature points. The estimated 3D point locations may then be used to solve the motion of the camera by a 3D/2D motion estimation. In a monocular configuration, both the relative motion of the camera and the 3D locations are estimated simultaneously. The latter technique has problems with stability, therefore, visual odometry systems based on stereo have been favored over monocular-based visual odometry systems.

A visual odometry system can often drift over time due to errors associated with stereo calibration or image quantization, poor-quality images, inaccurate feature positions, outliers, and instability of motion estimation using noisy correspondences. Most existing stereo-based visual odometry systems compute the pose between each pair of image frames separately, which is referred to as the frame-by-frame approach. Compared to traditional frame-by-frame approaches, experiments have shown up to a 27.7% reduction in navigation error when multi-frame tracking is performed. However, prior art multi-frame tracking approaches lack a metric to stop tracking when the tracked feature points become insufficient for pose estimation in terms of either quantity or spatial distribution.

Most of the stereo-based visual odometry systems in the prior art estimate pose from established 3D/2D feature correspondences. Since 3D coordinates of each feature point are reconstructed using the stereo-based triangulation, error introduced during 3D reconstruction needs to be minimized. However, in some stereo-based visual odometry systems, during stereo matching, no stereo geometric constraints are utilized to reduce the search region and a large amount of false stereo matches results.

Scenes to be monitored frequently contain moving objects such as walking persons, moving vehicles, waving trees, etc. If features in moving objects are selected during pose estimation, these features can negatively affect the accuracy of the resulting pose unless they are detected and discarded as outliers. In a nearly polar opposite scenario, there are situations where accuracy may degrade due to lack of features in the scene. For instance, the field-of-view of cameras may be occupied by a non-texture surface where feature detection is largely inhibited.

Accordingly, what would be desirable, but has not yet been provided, is stereo-based video odometry method for obtaining a pose of an object from a sequence of images which overcomes many of the problems described above in the prior art.

SUMMARY OF THE INVENTION

Disclosed is a method and system describing a visual odometry technique for estimating pose from a sequence of images, which includes the steps of detecting at least three feature points in both the left image and right image of a first pair of stereo images at a first point in time; matching the at least three feature points in the left image to the at least three feature points in the right image to obtain at least three two-dimensional feature correspondences; calculating the three-dimensional coordinates of the at least three two-dimensional feature correspondences to obtain at least three three-dimensional reference feature points; tracking the at least three feature points in one of the left image and right image of a second pair of stereo images at a second point in time different from the first point in time to obtain at least three two-dimensional reference feature points; and calculating a pose based on the at least three three-dimensional reference feature points and its corresponding two-dimensional reference feature points in the stereo images.

The pose is found by minimizing projection residuals of a set of 3D reference feature points in an image plane. Feature points correspond to Harris corners. The at least three three-dimensional feature points are found by triangulating the at least three two-dimensional feature correspondence from both the left image and the right image. Tracking of the at least three feature points is accomplished by detecting at least three feature points in both the left image and right image of the second pair of stereo images at the second point of time and matching the at least three feature points in one of the left image and right image of the first pair of stereo images to a corresponding one of the left image and the right image of the second stereo pair.

Tracking feature points and recalculating the pose is repeated for subsequent time intervals until the number of tracked features tracked in the subsequent time intervals relative to the first time interval falls below a predetermined number of features. The predetermined number of features is determined based on a spatial distribution metric.

DETAILED DESCRIPTION OF THE INVENTION

The following embodiments are intended as exemplary, and not limiting. In keeping with common practice, figures are not necessarily drawn to scale.

Figure 1:
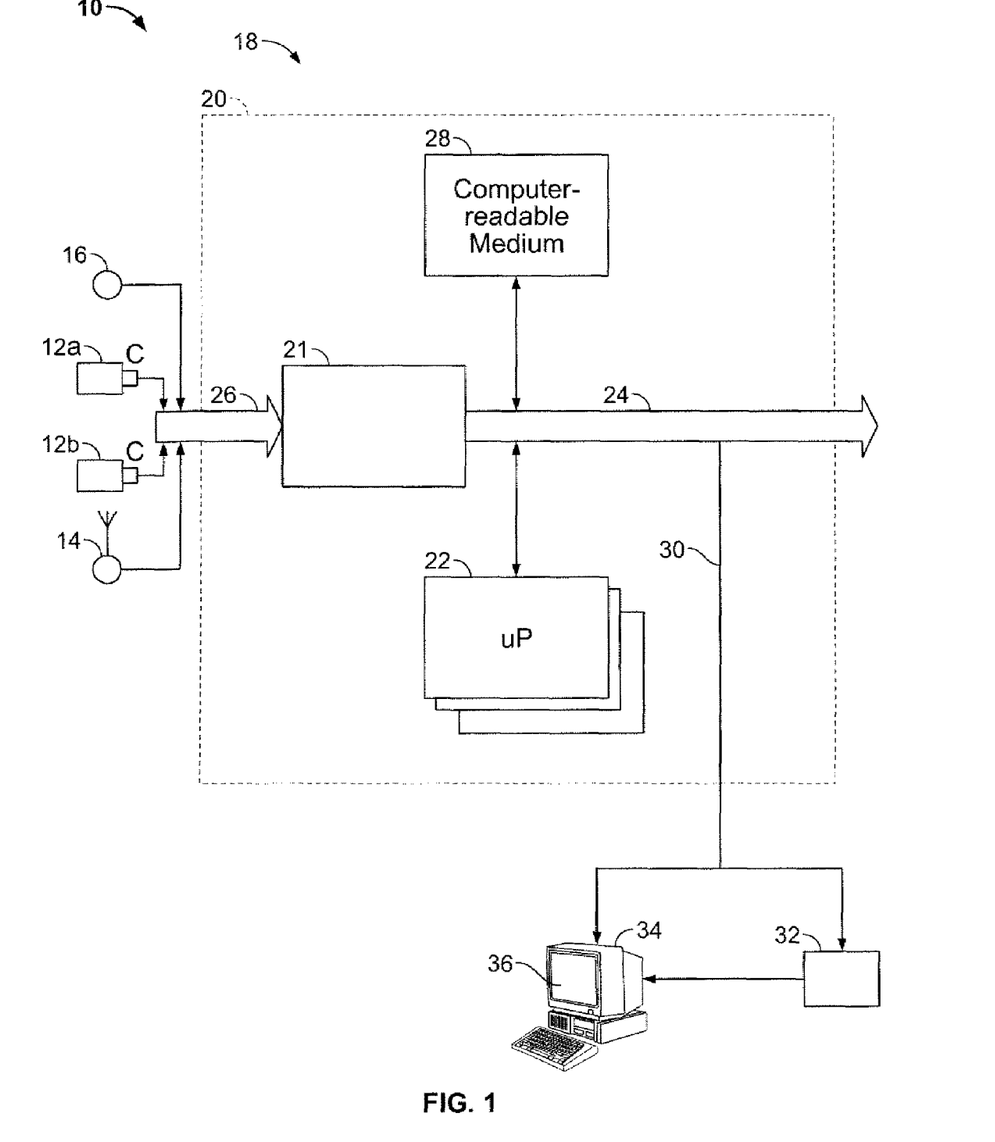
FIG. 1 is a block diagram of a hardware architecture of a stereo-based visual odometry system, constructed in accordance with an embodiment of the present invention.

Referring now to FIG. 1, a stereo-based visual odometry system is depicted, generally indicated at 10. By way of a non-limiting example, the system 10 receives digitized video from a pair of stereo images originating from a stereo camera or a pair of monocular cameras configured as a stereo camera 12a, 12b, which may be rigidly mounted on a frame relative to each other and designed to cover overlapping fields of view. The camera(s), 12a, 12b, have been calibrated to determine their intrinsic parameters and the rigid transformation between the two images. To capture positions in real world coordinates, the system 10 may be equipped with a global positioning system receiver (GPS) 14. The system 10 may also be equipped with an inertial measurement unit (IMU) 16 (e.g., a CloudCap Crista) to capture the orientation of the measurement platform. Data from all the sensors 12a, 12b, 14, 16 can be time-stamped and logged in real time at different rates (e.g., 30 Hz for the cameras 12a-12n, 100 Hz for then IMU 16, and 1 Hz for the GPS 14). The images 12a, 12b and the IMU 16 can be synchronized with an external hardware trigger (not shown) from a custom synchronization unit.

The system 10 can also include a digital video capture system 18 and a computing platform 20. The digital video capturing system 18 processes streams of digital video, or converts analog video to digital video, to a form which can be processed by the computing platform 20. The digital video capturing system may be stand-alone hardware, or cards 21 such as Firewire cards which can plug-in directly to the computing platform 20. The computing platform 20 may include a personal computer or work-station (e.g., a Pentium-M 1.8 GHz PC-104 or higher) comprising one or more processors 22 which includes a bus system 24 which is fed by video data streams 26 via the processor or directly to a computer-readable medium 28. The computer readable medium 28 can also be used for storing the instructions of the system 10 to be executed by the one or more processors 22, including an operating system, such as the Windows or the Linux operating system. The computer readable medium 28 can include a combination of volatile memory, such as RAM memory, and non-volatile memory, such as flash memory, optical disk(s), and/or hard disk(s). In one embodiment, the non-volatile memory can include a RAID (redundant array of independent disks) system configured at level 0 (striped set) that allows continuous streaming of uncompressed data to disk without frame-drops. In such a system, a processed video data stream 30 can be stored temporarily in the computer readable medium 28 for later output. In alternative embodiments, the processed video data stream 30 can be fed in real time locally or remotely via an optional transmitter 32 to a monitor 34. The monitor 34 can display processed video data stream 30 showing a scene 36 with which can be accompanied by text and/or numerical coordinates, such as GPS coordinates, IMU measurements, and pose calculations.

Figure 2:
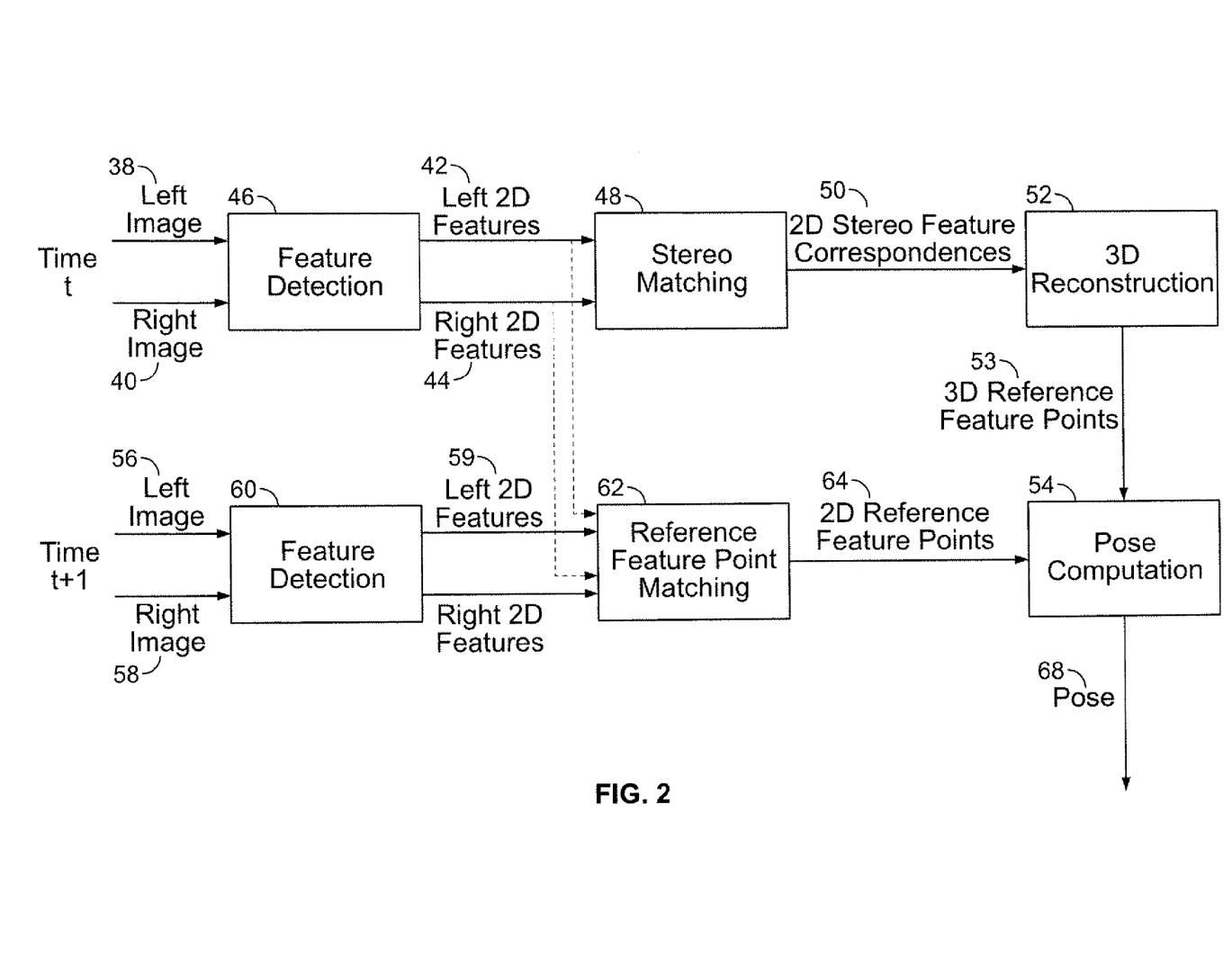
FIG. 2 is block diagram of software architecture associated with the system of FIG. 1, illustrating the steps taken in obtaining a pose from a series of stereo images.

Referring now to FIG. 2, a block diagram illustrating a summary of steps comprising video odometry algorithm of the present invention is depicted. Given a pair of stereo images 38, 40 at time interval T, respectively, a set of potential feature points 42, 44 for pose estimation is detected in the feature detection block 46. The set of potential feature points 42, 44 are extracted from the left and right images 38, 40, respectively, in the feature detection block 46 by means of a Harris corner detection algorithm as described in C. Harris and M. Stephens, "A Combined Corner and Edge Detector," *4th Alvey Vision Conference*, 1988, which is incorporated by reference in its entirety herein. The feature points detected in this algorithm are hereinafter known as Harris corners.

At block 48, stereo matching is used to find 2D stereo feature correspondences 50 by matching the extracted set of potential feature points 42, 44 between left and right images of a stereo pair. The 3D coordinates of each of the 2D stereo feature correspondences 50 are obtained in the 3D reconstruction block 52 by triangulation. The 3D coordinates thereby obtained serve as the 3D reference feature points 53 for pose computation in block 54 when a new pair of stereo images 56, 58 arrives at time T+1.

The next step is to perform feature tracking with the new pair of stereo images 56, 58 at time interval T+1. Once the new pair of stereo images 56, 58 is captured, a set of 2D reference feature points 64 is tracked in the left image 56 or the right image 58 individually. More specifically, the tracking is done with a very similar technique as in stereo matching: feature detection at block 60 followed by reference feature point matching at block 62. For example, either the left image 56 or the right image 58 is examined. If the left image 56 is chosen, left image processing is followed in subsequent steps and time intervals (and likewise right image processing is chosen if the right image is selected). Assuming the left images 38, 56 are chosen, in order to track the 2D reference feature points 64 of a new stereo pair, Harris corners are first extracted from the new left image 56 to provide a set of potential feature points 59 for matching in block 62. Then, each of the set of 2D reference feature points 64 is tracked by matching the extracted Harris corner feature points 59 in block 62 between the left images 38, 56 of the stereo pairs at time T and T+1, respectively. After the set of 2D reference feature points 64 are tracked, a set of 3D/2D feature correspondences can be established between the set of 3D reference feature points 53 from time T with the set of 2D reference feature points 64 from time T+1 in block 54. Using the set of 3D/2D correspondences and a pose calculation algorithm to be described hereinbelow, the relative pose 68 between these two pairs of stereo images can be estimated from the set of established 3D/2D feature correspondences.

Figure 3:
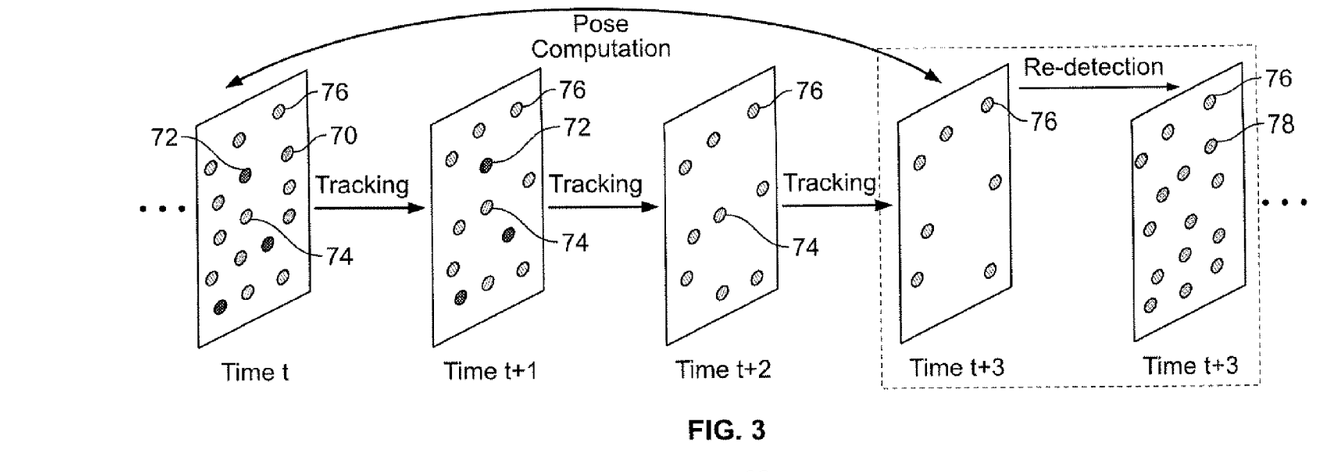
FIG. 3 is a schematic diagram illustrating the dynamic local landmark tracking technique of the present invention, showing the tracking of local landmarks across several frames and the re-initialization of obtaining landmarks to track after most of the local landmarks have moved out of view.

The feature tracking steps, i.e., extracting Harris corner feature points and performing tracking of feature points in the left (right) image at later time intervals to the feature points extracted at time T, are repeated for subsequent time intervals T+2, T+3 etc. At each new time interval T+2, T+3, the relative pose is recomputed from the remaining tracked feature points. However, if the system of the present invention moves by a large motion step, most of the set of reference feature points 64 move out of the field-of-view of the cameras. This is illustrated in FIG. 3. At time T, there are four sets of feature points, 70, 72, 74, 76. At time T+1, the tracking algorithm tracks feature points 72, 74, 76, but feature points 70 have moved out of view. At time T+2, feature points 72 have moved out of view, while at time T+3, only feature points 76 remain to be tracked. Therefore, it is desirable to update the set of reference feature points 64 frequently so that there are always enough reference feature points for pose computation. As a result, a new set of Harris corner feature points 78 in addition to the remaining feature points 76 are detected and matched between left and right stereo images at time T+3. Tracking between feature points at time interval T+3 and subsequent frames, T+4, T+5, etc., is repeated for the new set of feature points in either the left or right images of the subsequent frames, as described above. The updated reference feature points are utilized to estimate the pose in subsequent pair of stereo images. The whole process repeats to efficiently recover the full 3D track.

Precise and robust feature detection and tracking in images is needed to maintain accurate pose estimation. This requires that feature detection and tracking errors be kept to a minimum. Extracting a set of reliable features for each pose computation can be challenging due to such factors as motion of a camera, changes in a scene background, changes in a camera's viewpoint, changes in illumination, and occlusion. In addition, as a camera moves, some features move out of the field-of-view of the camera and new features move into the field-of view. The new and surviving features need to be detected and tracked in subsequent frames. Techniques of the present invention to maintain accurate feature detection, feature tracking, and feature matching are considered in more detail hereinbelow.

To handle the appearance and disappearance of the features, feature detection and matching are performed in each image frame. Since Harris corners are relatively stable under small to moderate image distortions, Harris corner extraction is performed in every frame and the extracted Harris corners will serve as the 2D feature points for the pose computation. Once a set of feature points are extracted from each frame, they are matched to subsequent frames to find their correspondences. The matching procedure used can be found in D. Nister, O. Naroditsky and J. Bergen, "Visual Odometry," *IEEE Conference on CVPR*, 2004. which is incorporated herein by reference in its entirety. A summary of the feature matching procedure is as follows: For each feature point $x_i$ in the first frame, a region in the second image around the location $x_i$ is searched for its correspondence $x_i'$. The search is based on the similarity of the local image patches centered on the feature points. Normalized correlation over an 11×11-pixel window is used to measure the similarity. Finally, a feature that produces the highest similarity score is considered a match.

Given a pair of stereo images, the task of stereo feature matching is to match the extracted feature points between the left and right images. In practice, the viewpoints of the left and right cameras in a stereo system are different so that the image appearances of a same feature point may be significantly different in the left and right images. On the other hand, since all the feature points are corners, it is also very common for them to look similar to each other. As a result, false stereo matches may occur when using a large search region.

To reduce or eliminate possible false stereo matches, a techniques called constrained stereo feature matching is employed. Two types of geometric constraints can be applied to reduce search space during stereo feature matching. These are epipolar geometry constraint and disparity constraint, which are described in R. Hartley and A. Zisserman, "Multiple View Geometry in Computer Vision," *Cambridge University Press*, 2003, pp. 239-258, which is incorporated herein by reference in its entirety. With the use of these two constraints, most of the geometrically infeasible feature matches are eliminated.

Once a set of stereo feature point matches are obtained a each stereo pair, the 3D coordinates of each matched feature are reconstructed by triangulation. The resulting 3D coordinates serve as 3D reference points during pose computation. These 3D reference feature points need to be tracked in the subsequent image frames. Similar to stereo matching, feature tracking is performed with the Harris corner detection and matching technique. However, different from the stereo matching, feature matching is performed between the left images or the right images of two different stereo pairs. Since the relative pose between these two stereo pairs is not known, there are no geometric constraints that can be used during matching. As a result, falsely tracked features may occur. In order to discard those falsely tracked reference feature points, a dynamic local landmark tracking technique is used.

Referring again to FIGS. 2 and 3, the dynamic local landmark tracking technique begins with obtaining the set of 3D reference feature points 53, referred to as local landmarks, and the stereo pair 38, 40 at time interval T, are referred to as the 3D reference frame, respectively. The set of 3D reference feature points 53 are to be tracked in subsequent frames. Given a new stereo pair 56, 58 at time T+1, the set of local landmarks with more distinctive intensity distributions are tracked. As the camera moves, some of the local landmarks will move out of the field-of-view of the cameras. Besides the local landmarks that move out of the field-of-view of the camera, another set of local landmarks also lose tracking due to their non-distinctive intensity distributions. Local landmarks with more distinctive intensity distributions survive longer during tracking. Hence, by tracking only those landmarks with distinctive intensity distributions, the unstable local landmarks, which usually happen to be the false matches, are reduced significantly. Even with tracking of landmarks with distinctive intensity distributions, more and more of these landmarks can also move out of the field-of-view of the cameras as the system moves. Since the spatial distribution of the tracked local landmarks is needed for accurate pose estimation, a metric is needed to measure the spatial distribution of the tracked local landmarks. Hence, when the set of tracked local landmarks become badly distributed, i.e., too few in number, a set of new local landmarks is initialized.

Figure 4:
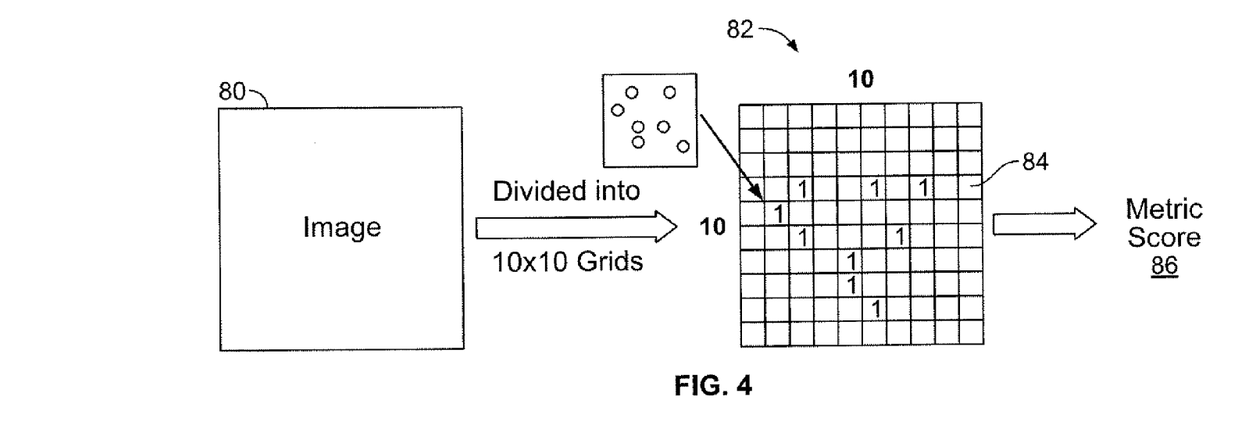
FIG. 4 is schematic diagram illustrating how a metric for measuring the spatial distribution of the tracked local landmarks is obtained.

Referring now to FIG. 4, a metric for measuring the spatial distribution of the tracked local landmarks is illustrated. The left or right image 80 used for tracking in subsequent frames is divided into 10×10 grids 82. Each resulting grid square 84 is searched for whether it contains local landmarks. If it does, it is assigned a binary value, e.g., 1, indicating detection, otherwise, it is assigned a zero. The total number of grid square that contain local landmarks is counted and used as a metric score 86. The spatial distribution metric score 86 is computed for each frame at time intervals T+1, T+2, T+3, etc. . . If the spatial distribution metric score 86 is greater than a predefined threshold, preferably set to 50 empirically, the pose is computed from the 3D/2D correspondences of tracked local landmarks between the current stereo pair at times T+1, T+2, T+3, etc., and the 3D reference frame at time T. If the spatial distribution metric score 86 for matches between subsequent frames becomes less than the threshold, then a new reference image is established. The stereo matching technique described above is re-activated to extract a set of new 3D reference feature points from the current pair of stereo images at say, time =T+3. At the same time, the current stereo pair at time T+3 can be updated as the 3D reference frame, and the new set of extracted reference feature points can be updated as local landmarks. These newly updated local landmarks are tracked in the subsequent stereo image frames (e.g., T+4, T+5, etc.), and the whole dynamical local landmark tracking technique repeats to recover the entire traveled 3D path.

To estimate pose given the set of 3D/2D correspondences $(X_i, x_i)$ of n of reference features, a rotation matrix and the translation vector that maps the world coordinate system to the camera coordinate system is found. In general, the pose is found by minimizing the projection residuals of a set of 3D reference feature points in the image plane as follows:

$$\min \sum_{i=1}^{n} r_i^2$$

where $r_i = \|x_i - \hat{x}_i\|$ and $\hat{x}_i = \text{Proj}(RX_i + T)$ (Proj denotes the camera projection function, and n>=3, wherein the reference features correspond to the at least three tracked features. R is a rotation matrix and T is the translation vector that maps the world coordinate system to the coordinate system of the stereo pair of images. $x_i$ is the 2D coordinates of a feature point in the image. $X_i$ is its corresponding 3D coordinates in the world coordinate system. Note that, in order to estimate the pose parameters R and T from the image projection equation $\hat{x}_i = \text{Proj}(RX_i + T)$, at least three known feature points are required to solve the equation. This also puts the same minimum of 3 requirement on the number of tracked features, feature correspondences, etc. (n>=3). More details can be found in the following paper: R. Haralick, C. Lee, K. Ottenberg and M. Nolle, "Review and Analysis of Solutions of the Three Point Perspective Pose Estimation Problem", International Journal of Computer Vision, 13(3):331-356, 1994, which is incorporated herein by reference in its entirety.

Since the 3D coordinates in a 3D/2D feature correspondence are computed through the 3D reconstruction from the reference stereo pair, each feature may have a 3D reconstruction error. To minimize the effect of the 3D reconstruction error on the pose estimation, t the 3D position of each feature needs be reconstructed as accurately as possible. To accomplish this, a dynamic 3D reference selection technique is used to select the stereo pair that produces the least 3D reconstruction error caused by depth as the reference during pose computation. In addition, since the above pose estimation technique considers all the features during minimization, a single outlier can have a large effect on the estimated pose. In practice, the scene is not completely stationary so that it is common that some features will be located in the moving objects. Together with falsely matched features, outliers can affect the resulting pose significantly. Therefore, an outlier removal technique can be incorporated into the method of estimating pose of the present invention.

During 3D reconstruction, uncertainty in the reconstructed 3D coordinates of a feature point varies with the depth. Usually, the points with larger depth will have larger uncertainty. Hence, as a point moves away from the camera, its associated 3D reconstruction error will become larger and larger. Depending on the moving speed and the motion type of the system, during the forward running-truck case, the distance of the camera between the selected stereo pairs can be several meters away in depth. Therefore, when the same feature point is reconstructed in both stereo pairs, the 3D reconstructed error in each stereo pair can be considerably different. Normally, the stereo pair at later time intervals during pose computation is selected temporally, which means that the old stereo pair at time T is always selected as the reference pair. Therefore, for the above forward running-truck case, the 3D reconstruction error is larger than the error that would be produced if the stereo pair at a later time interval is selected as reference for 3D reconstruction.

As a result, during the pose computation (and not during the tracking procedure), the reference stereo pair needs to be selected dynamically in order to reduce the 3D reconstruction error introduced by depth. One technique is to dynamically select the reference stereo pair via the motion type of the system. In practice, for the 3D reconstruction, the points close to the camera will be more accurate. Specifically, for the forward motion, a later stereo pair is selected as the reference frame, since a camera moving towards the points in the scene produces less 3D reconstruction error in later stereo frames. For the backward motion, the older stereo pair is selected as the reference frame, since a camera moving away from the points in the scene, produces less 3D reconstruction error in an older frame. The dynamic reference frame selection is only for the pose computation, and does not change the local landmark tracking process, since local landmark tracking provides the set of points for pose computation.

In order to detect and reject the outliers in a set of 3D/2D feature correspondences, a Least Median of Squares (LMedS) approach is used. Specifically, a set of initial pose parameters is estimated as follows:

From n 3D/2D feature correspondences, generate a set of hypotheses $H_i$ (i=1, . . . , N) by drawing N random subsamples of 3 different feature correspondences.

For each hypotheses $H_i$ consisting of 3 different feature correspondences, a set of pose parameters $P_i = (R_i, T_i)$ can be computed.

For each set of estimated pose parameters $P_i$, the median of the squared residuals, denoted by $Mr_i$, is obtained from the residuals $r_k$ (k=1, . . . , n) with respect to the whole set of feature correspondences.

From the N sets of estimated pose parameters $P_i = (R_i, T_i)$, the one $P_{min}$ that produces the minimal median $Mr_{min}$ of the squared residuals is chosen as the final set of pose parameters.

The outliers are usually those that produce larger residuals given the correct pose parameters. With the Least Median of Squares technique, errors of the largest ranked half of feature correspondences are ignored in order to reduce the effects of feature outliers during pose estimation.

Once the set of initial pose parameters $P_{min}$ is obtained, the standard deviation $\hat{\sigma}$ is computed from the obtained minimal median $Mr_{min}$ as follows:

$$\hat{\sigma} = 1.4826 \times [1 + 3/n] \sqrt{Mr_{min}}$$

where 1.4826 is a coefficient to achieve the same efficiency as a least-squares in the presence of only Gaussian noise, and $3/n$ is for compensating for the effect of a small data set. Subsequently, the outlier rejection is done with the use of the standard deviation $\hat{\sigma}$. Specifically, the feature points whose residuals are more than $2\hat{\sigma}$ under the estimated pose parameter set $P_{min}$ are rejected as outliers.

Finally, on the set of remaining 3D/2D feature correspondences, a pose refinement procedure with the use of nonlinear optimization technique starting from the estimated pose parameter set $P_{min}$ is applied to more accurately estimate pose. More specifically, the Levenberg-Marquardt technique is used and the detailed algorithm can be found in R. Hartley and A. Zisserman, "Multiple View Geometry in Computer Vision," *Cambridge University Press*, 2003, pp. 569-528, which is incorporated herein by reference in its entirety.

To increase the accuracy and robustness of the system and to reduce long-term drift of pose estimation as much as possible, the visual odometry system of the present invention can be integrated with a MEMS (Microelectromechanical Systems) based IMU and a GPS unit using an extended Kalman filter (EKF) framework. A "constant velocity, constant angular velocity" model is chosen for filter dynamics. The state vector comprises 13 elements: T, 3-vector representing position in navigation coordinates, q, unit quaternion (4-vector) for attitude representation in navigation coordinates, v, 3-vector for translational velocity in body coordinates, and $\omega$, 3-vector for rotational velocity in body coordinates. Quaternion representation for attitude has several practical properties. Each component of the rotation matrix in quaternion is algebraic, eliminating the need for transcendental functions. It is also free of the singularities that are present with other representations and the prediction equations are treated linearly. Based on this, the process model we adopted is given by $$T_k = T_{k-1} + R^T(q_{k-1})T_{rel}$$
$$q_k = q_{k-1} \otimes q(\rho_{rel})$$
$$\omega_k = \omega_k = \omega_{k-1} + n_{v,k-1}\Delta t$$
$$v_k = v_{k-1} + n_{\omega,k-1}\Delta t$$

where $$T_{rel} = v_{k-1}\Delta t + n_{v,k-1}\frac{\Delta t^2}{2}$$
$$\rho_{rel} = \omega_{k-1}\Delta t + n_{\omega,k-1}\frac{\Delta t^2}{2}$$

and $\otimes$ is used to denote the quaternion product operation. Above, $\rho$ is the rotation vector (representing the rotation axis) in the body frame, $R(q)$ is the rotation matrix determined by the attitude quaternion q in the navigation frame, and $q(\rho)$ is the quaternion obtained from the rotation vector $\rho$. Undetermined accelerations in both translational and angular velocity components are modeled by zero mean white Gaussian noise processes $\{n_{v,k}\}$ and $\{n_{\omega,k}\}$.

It has been observed that throughout most data sequences where the images contain features that are accurately tracked, there is a very high degree of agreement between the angular velocities computed by visual odometry alone and those available from angular rate sensors (gyros) in the IMU. Therefore, raw gyro readings can be chosen from the IMU directly as measurements in the Kalman filter. The observations from visual odometry, IMU and GPS are used according to the following measurement model:

$$T_k^{gps} = T_k + n_k^{gps}$$
$$v_k^{vo} = v_k + n_{v,k}^{vo}$$
$$\omega_k^{vo} = \omega_k + n_{\omega,k}^{vo}$$
$$\omega_k^{imu} = \omega_k + n_{v,k}^{imu}$$

Here, $v_k^{vo}$ and $\omega_k^{vo}$ are translational and angular velocity measurements provided by visual odometry (vo), $\omega_k^{imu}$ is the gyro output provided by the IMU and $T_k^{gps}$ is the position measurement provided by the GPS unit. Uncertainty in the visual odometry pose estimates, represented by the noise components $n_{v,k}^{vo}$ and $n_{\omega,k}^{vo}$ is estimated based on the reprojection error covariance of image features through backward propagation. The gyro noise errors are modeled with fixed standard deviation values that are much higher than those corresponding to the visual odometry noise when the pose estimates are good (which is the most common case in an outdoor situation) and are comparable in value or sometimes even less when vision based pose estimation is difficult due to brief instances which is mostly common in an indoor situation. This allows the filter to effectively combine the two measurements at each time update, relying more on the sensor with the better noise characteristics. In addition, to control the amount of vertical drift, elevation measurements are used that are assumed to be constant except when there is staircase climbing. This assumes the ground plane to be flat which is a good assumption except when the user moves from one floor to another inside a building. To accommodate local violations from this planar motion assumption due to kneeling, crouching, etc., a 1 meter standard deviation for the measurement noise $n_k^h$ is used:

$$h_k = T_k(2) + n_k^h$$

In order to obtain the initial position and attitude of the camera in navigation coordinates, roll and pitch outputs from an IMU are used directly and heading is obtained by the aid of the first two GPS readings that are sufficiently spread apart. During filter operation, bad measurements from all sensors are rejected using validation mechanisms based on Chi-square tests on the Kalman innovations. In addition, those measurements from visual odometry causing large accelerations are also discarded.

The present invention has many advantages over prior art visual odometry systems and methods for estimating pose. For example, prior art multi-frame tracking approaches lack a metric to stop tracking when the tracked feature points become insufficient for pose estimation in terms of either quantity or spatial distribution. In the present invention, a dynamic local landmark tracking technique is disclosed which automatically selects an optimal set of tracked feature points across image frames for pose estimation. In the present invention, epipolar-geometry and disparity constraints are applied to reduce search region for matching so that the 3D reconstruction error caused by false stereo matches can be minimized. In order to further reduce 3D reconstruction error caused by depth, a dynamic 3D reference selection technique is also disclosed to dynamically select the frame that produces fewer 3D reconstruction error as the reference frame during pose computation. To reduce errors associated with scenes containing moving objects during pose estimation, the present invention provides an outlier removal procedure. In order to reduce drift due to lack of features in a scene, the present invention integrates data from non-visual sensors such as GPS, Inertial Measurement Units (IMU) and orientation sensors. An Extended Kalman Filter (EKF) framework integrates both IMU and GPS measurements with the visual odometry measurements.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed:

1. A method for obtaining a pose of an object from a sequence of images, comprising the steps of:
   (a) detecting at least three feature points in both the left image and right image of a first pair of stereo images at a first point in time;
   (b) matching the at least three feature points in the left image to the at least three feature points in the right image to obtain at least three two-dimensional feature correspondences;
   (c) calculating the three-dimensional coordinates of the at least three two-dimensional feature correspondences to obtain at least three three-dimensional reference feature points;
   (d) tracking the at least three feature points in one of the left image and right image of a second pair of stereo images at a second point in time different from the first point in time to obtain at least three two-dimensional reference feature points; and
   (e) calculating a pose based on the at least three three-dimensional reference feature points and its corresponding two-dimensional reference feature points in the stereo images.

2. The method of claim 1, wherein the step (e) further comprises the step of minimizing projection residuals of a set of three-dimensional reference feature points in an image plane.

3. The method of claim 2, wherein the step of minimizing projection residuals in an image plane further comprises the step of finding $$\min \sum_{i=1}^{n} r_i^2 \text{ where } r_i = \|x_i - x_i'\| \text{ and } x_i' = Proj(RX_i + T)$$

wherein Proj denotes the projection function,
wherein $n >= 3$,
wherein the reference features correspond to the at least three tracked features,
wherein R is a rotation matrix and T is the translation vector that maps the world coordinate system to the coordinate system of the stereo pair of images,
wherein $x_i$ is the 2D coordinates of a feature point in the image, and
wherein $X_i$ is its corresponding 3D coordinates in the world coordinate system.

4. The method of claim 1, wherein the step (a) further comprises the step of detecting at least three Harris corners.

5. The method of claim 1, wherein step (b) the step of finding the similarity of local image patches centered on the feature points, wherein a normalized correlation over an 11×11-pixel window is used to measure the similarity, and wherein a feature that produces the highest similarity score is considered a match.

6. The method of claim 1, wherein (c) further comprises the step of triangulating the at least three two-dimensional feature correspondence from both the left image and the right image.

7. The method of claim 1, wherein (d) further comprises the steps of:
   detecting at least three feature points in both the left image and right image of the second pair of stereo images at the second point of time and
   matching the at least three feature points in one of the left image and right image of the first pair of stereo images to a corresponding one of the left image and the right image of the second stereo pair.

8. The method of claim 7, wherein the step of detecting the at least three feature points in both the left image and right image of the second pair of stereo images comprises the step of detecting at least three Harris corners.

9. The method of claim 1, wherein steps (d) and (e) are repeated for subsequent time intervals.

10. The method of claim 9, wherein steps (a)-(e) are repeated at a later time period when the number of tracked features tracked in the subsequent time intervals relative to the first time interval falls below a predetermined number of features.

11. The method of claim 10, wherein the tracked features are landmarks with a distinctive intensity distribution.

12. The method of claim 11, wherein the predetermined number of features is determined based on a spatial distribution metric.

13. The method of claim 12, wherein the spatial distribution metric is calculated by performing the steps of:
   dividing one of the left and right images at a subsequent time interval into 10×10 grids of grid squares;
   searching each grid square for the presence of at least one local landmark;
   assigning an indicator indicating the presence of at least one local landmark to a grid square if at least one local landmark is present in the grid square; and
   counting the number of grid squares containing at least one local landmark to determine a number to be assigned to the spatial distribution metric.

14. The method of claim 13, wherein the metric is set to about 50.

15. The method of claim 1, further comprising the step of applying one of an epipolar geometry constraint and a disparity constraint for reducing a search space during the performance of step (b).

16. The method of claim 1, wherein steps (d) and (e) are performed at a second point in time that is later than the first point in time during forward motion of images, and wherein steps (d) and (e) are performed at a second point in time that is earlier than the first point in time for reverse motion of images.

17. The method of claim 1, wherein a three-dimensional feature point and a corresponding two-dimensional reference point are discarded from a set of three-dimensional reference feature points and a corresponding set of two-dimensional reference points for obtaining a set of poses based on a Least Median of Squares approach.

18. A visual odometry system for estimating pose from a sequence of images, comprising:
   means for obtaining a sequence of stereo images;
   a processor and a memory for performing the steps of:

(a) detecting at least three feature points in both the left image and right image of a first pair of stereo images at a first point in time;
(b) matching the at least three feature points in the left image to the at least three feature points in the right image to obtain at least three two-dimensional feature correspondences;
(c) calculating the three-dimensional coordinates of the at least three two-dimensional feature correspondences to obtain at least three three-dimensional reference feature points;
(d) tracking the at least three feature points in one of the left image and right image of a second pair of stereo images at a second point in time different from the first point in time to obtain at least three two-dimensional reference feature points; and
(e) calculating a pose based on the at least three three-dimensional reference feature points and its corresponding two-dimensional reference feature points in the stereo images; and
a display for displaying the calculated pose.

19. The apparatus of claim 18, further comprising an IMU for sending measurements of orientation to said processor.

20. The apparatus of claim 19, further comprising a GPS receiver for sending a measurement of position to said processor.

21. The apparatus of claim 20, wherein said measurement of orientation and said measurement of position are integrated into a pose calculation by said processor using an extended Kalman filter framework.

22. The apparatus of claim 21, wherein filter dynamics for said extended Kalman filter framework is based on a constant velocity, constant angular velocity model.

23. A non-transitory computer-readable medium carrying one or more sequences of instructions for estimating pose from a sequence of images, wherein execution of the one of more sequences of instructions by one or more processors causes the one or more processors to perform the steps of:
(a) detecting at least three feature points in both the left image and right image of a first pair of stereo images at a first point in time;
(b) matching the at least three feature points in the left image to the at least three feature points in the right image to obtain at least three two-dimensional feature correspondences;
(c) calculating the three-dimensional coordinates of the at least three two-dimensional feature correspondences to obtain at least three three-dimensional reference feature points;
(d) tracking the at least three feature points in one of the left image and right image of a second pair of stereo images at a second point in time different from the first point in time to obtain at least three two-dimensional reference feature points; and
(e) calculating a pose based on the at least three three-dimensional reference feature points and its corresponding two-dimensional reference feature points in the stereo images.

24. A method for obtaining a pose of an object from a sequence of images, comprising the steps of:
(a) detecting at least one feature point in both the left image and right image of a first pair of stereo images at a first point in time;
(b) matching the at least one feature point in the left image to the at least one feature point in the right image to obtain at least one two-dimensional feature correspondence;
(c) calculating the three-dimensional coordinates of the at least one two-dimensional feature correspondence to obtain at least one three-dimensional reference feature point;
(d) tracking the at least one feature point in one of the left image and right image of a second pair of stereo images at a second point in time different from the first point in time to obtain at least one two-dimensional reference feature point; and
(e) calculating a pose based on the at least one three-dimensional reference feature point and its corresponding two-dimensional reference feature point in the stereo images.

25. The method of claim 24, wherein the step (e) further comprises the step of minimizing projection residuals of a set of three-dimensional reference feature points in an image plane.

26. The method of claim 25, wherein the step of minimizing projection residuals in an image plane further comprises the step of finding $$\min \sum_{i=1}^{n} r_i^2 \text{ where } r_i = \|x_i - x_i'\| \text{ and } x_i' = Proj(RX_i + T)$$

wherein Proj denotes the projection function,
wherein n >=3,
wherein the reference features correspond to the at least three tracked features,
wherein R is a rotation matrix and T is the translation vector that maps the world coordinate system to the coordinate system of the stereo pair of images,
wherein $x_i$ is the 2D coordinates of a feature point in the image, and wherein $X_i$ is its corresponding 3D coordinates in the world coordinate system.

* * * * *